(12) United States Patent
Bodie et al.

(10) Patent No.: US 9,676,569 B2
(45) Date of Patent: Jun. 13, 2017

(54) LOW PROFILE TRANSFER CONVEYOR

(71) Applicant: Brandt Agricultural Products Ltd., Regina (CA)

(72) Inventors: Cameron Dwight Bodie, Moose Jaw (CA); Jaime Nolin Tratch, Yorkton (CA); Jonathan Robert Carteri, Regina (CA); Michael Ryan Kaeding, Regina (CA)

(73) Assignee: Brandt Agricultural Products Ltd., Regina (CA)

( * ) Notice: Subject to any disclaimer, the term of this patent is extended or adjusted under 35 U.S.C. 154(b) by 0 days.

(21) Appl. No.: 15/093,847

(22) Filed: Apr. 8, 2016

(65) Prior Publication Data

US 2016/0297629 A1 Oct. 13, 2016

(30) Foreign Application Priority Data

Apr. 8, 2015 (CA) ..................................... 2887515

(51) Int. Cl.
*B65G 67/24* (2006.01)
*B65G 33/18* (2006.01)
*B65G 33/32* (2006.01)
*B65G 47/20* (2006.01)

(52) U.S. Cl.
CPC ............. *B65G 67/24* (2013.01); *B65G 33/18* (2013.01); *B65G 33/32* (2013.01); *B65G 47/20* (2013.01)

(58) Field of Classification Search
CPC ........ B65G 33/08; B65G 33/10; B65G 47/20; B65G 65/22; B65G 67/24; B65G 2201/042

USPC ....................................... 198/311, 550.1, 625
See application file for complete search history.

(56) References Cited

U.S. PATENT DOCUMENTS

| | | | | |
|---|---|---|---|---|
| 3,391,779 A | * | 7/1968 | Scheel ................... | B65G 67/24 198/582 |
| 3,549,000 A | * | 12/1970 | Christian ............... | B65G 33/00 198/625 |
| 4,813,839 A | | 3/1989 | Compton | |
| 4,963,066 A | * | 10/1990 | Boppart .................. | B60P 1/40 198/311 |
| 5,964,566 A | | 10/1999 | Stewart et al. | |

(Continued)

FOREIGN PATENT DOCUMENTS

JP 2002 255 331 A 9/2002

OTHER PUBLICATIONS

Canadian Office Action dated Jan. 9, 2017 for Application No. CA 2,926,270, 4 pgs.

*Primary Examiner* — Gene Crawford
*Assistant Examiner* — Keith R Campbell
(74) *Attorney, Agent, or Firm* — Frost Brown Todd LLC

(57) ABSTRACT

A transfer conveyor apparatus has a horizontally oriented receiving hopper defined by walls and a floor. A transition auger slopes upward and rearward from a bottom end thereof located in a rear portion of the receiving hopper. A plurality of hopper augers extend from the front wall to the rear portion of the receiving hopper. A right hopper auger is in proximity to and parallel to the right side wall and a left hopper auger is in proximity to and parallel to the left side wall. The hopper auger shafts are parallel and spaced apart by a spacing distance substantially equal to or less than the hopper auger diameter, and an auger drive is operative to rotate the hopper augers and the transition auger.

16 Claims, 3 Drawing Sheets

(56) References Cited

U.S. PATENT DOCUMENTS

| | | | | |
|---|---|---|---|---|
| 6,976,819 B2* | 12/2005 | Kulbeth | ................. | B65G 33/10 |
| | | | | 198/550.1 |
| 7,090,066 B2* | 8/2006 | Kirsch | ................... | B65G 67/24 |
| | | | | 198/302 |
| 8,662,285 B2 | 3/2014 | Jesse | | |
| 2014/0086721 A1* | 3/2014 | Wehrle | ................... | B65G 33/32 |
| | | | | 414/809 |

* cited by examiner

LOW PROFILE TRANSFER CONVEYOR

CROSS REFERENCE TO RELATED APPLICATION

This application claims the benefit of and priority to Canadian Patent Application Serial no. 2,887,515, filed Apr. 8, 2015, the contents of which are incorporated herein in its entirety for all purposes.

FIELD OF THE INVENTION

This disclosure relates to the field of conveyors and in particular a transfer conveyor for receiving granular material from a discharge, such as the discharge of a hopper bottom trailer.

BACKGROUND

Granular material such as grain and like agricultural products are commonly transported in trailers with hoppered compartments. The granular material is discharged through an opening in the bottom center of the trailer. To receive this discharged material a conveyor intake is located under the discharge opening. In permanent conveyor installations the trailer is commonly driven over a receiving pit and the material is directed to the conveyor intake.

In many industries however, such as agriculture, portable conveyors are used which are moved from location to location. These portable conveyors typically include a transfer conveyor with a conveyor intake located under the trailer discharge opening, and a conveyor discharge oriented to discharge into the intake of a main conveyor. One such common transfer conveyor is a swing auger pivotally attached to the main conveyor intake, such as disclosed in U.S. Pat. No. 8,662,285 to Jesse. The conveyor intake is provided by a receiving container with sides sloping to direct received material into one or more generally horizontal augers, which carry the material to an inclined auger which in turn carries the material to the main auger.

It is also known to configure the transfer conveyor intake such that the trailer drives over the intake to locate the trailer discharge over the intake. U.S. Pat. No. 5,964,566 to Stewart et al. discloses a drive-over transfer conveyor where the conveying mechanism is provided by a chain with paddles which provides a low profile to facilitate driving over the intake. U.S. Pat. No. 4,813,839 to Compton discloses a drive-over transfer conveyor where the conveying mechanism is provided by a belt which also provides a low profile.

U.S. Pat. No. 7,090,066 to Kirsch discloses a drive-over transfer conveyor where the conveying mechanism inside the receiving container is provided by a pair of horizontal augers. The ramps of Kirsch are configured to fold up to provide a sufficient ramp length to allow a trailer to roll over the top of the receiving container which is higher than that of Stewart et al.

Since the capacity of an auger is related to its diameter, the augers in such transfer conveyors must have a sufficiently large diameter to provide the desired capacity. Typically there are two to three horizontal augers, each with a diameter of 6 inches or more.

Some products such as oilseeds and fertilizer are problematic for conveying with a belt conveyor. Oilseeds such as canola are very small and slippery and leak into various areas of the conveyor and build up a gummy accumulation on rollers and other parts. Some fertilizers react with rubber belting reducing belt life.

SUMMARY OF THE INVENTION

The present disclosure provides a transfer conveyor apparatus that overcomes problems in the prior art.

The present disclosure provides a transfer conveyor apparatus comprising a substantially horizontally oriented receiving hopper defined by front and rear end walls, right and left side walls, and a floor. A transition auger with a transition auger diameter, a transition flight, and transition shaft slopes upward and rearward from a bottom end thereof located in a rear portion of the receiving hopper. A plurality of hopper augers extend from the front wall to the rear portion of the receiving hopper, each hopper auger having a hopper auger diameter, and a hopper auger flighting extending from a hopper auger shaft. A right hopper auger is in proximity to and parallel to the right side wall and a left hopper auger is in proximity to and parallel to the left side wall. The hopper auger shafts are parallel and spaced apart by a spacing distance substantially equal to or less than the hopper auger diameter, and an auger drive is operative to rotate the hopper augers and the transition auger.

The present disclosure provides a transfer conveyor apparatus with a low profile receiving hopper, while still providing significant capacity. The low profile of the apparatus makes it well suited to use as a drive-over type transfer auger where trailers are driven over the rear portion of the receiving hopper to position the bottom discharge opening above the receiving hopper.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
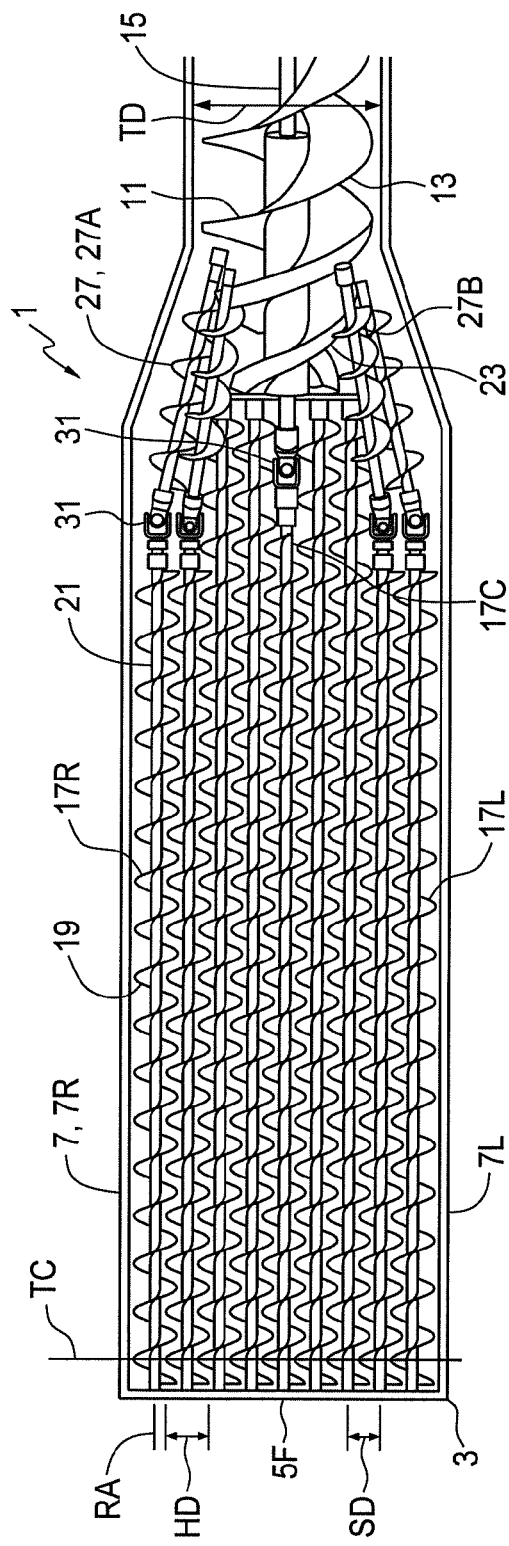
FIG. 1 is a schematic top view of an embodiment of the transfer conveyor apparatus of the present disclosure.
Figure 2:
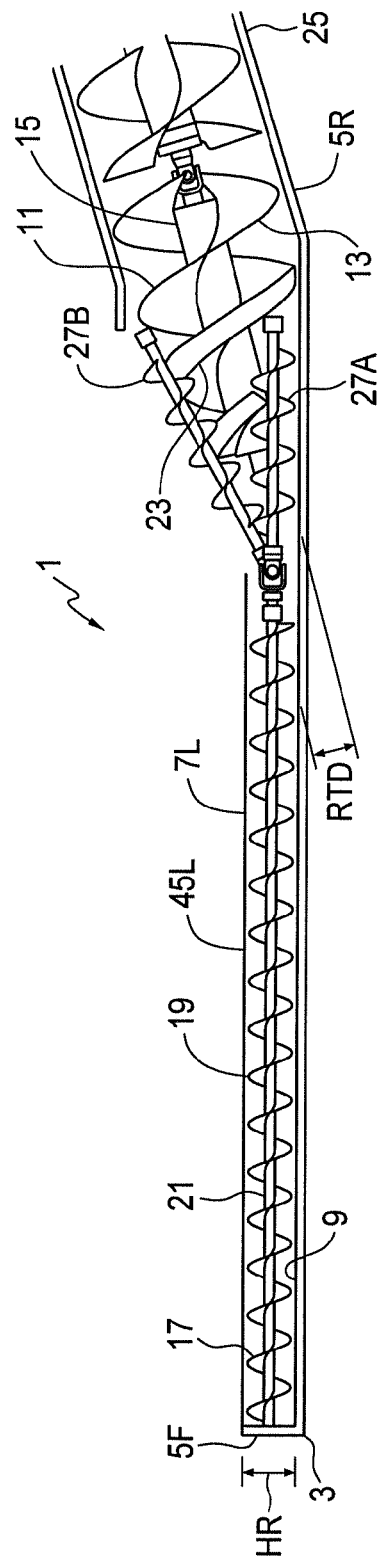
FIG. 2 is a schematic sectional side view of the embodiment of FIG. 1.

FIGS. 1 and 2 schematically illustrate an embodiment of a transfer conveyor apparatus 1 of the present disclosure. The apparatus 1 comprises a horizontally oriented receiving hopper 3 defined by front and rear end walls 5F, 5R, right and left side walls 7R, 7L, and a floor 9. A transition auger 11 has a transition auger diameter TD, a transition flight 13, and transition shaft 15 sloping upward and rearward from a bottom end thereof located in a rear portion of the receiving hopper 3. A plurality of hopper augers 17 extend from the front wall 5F to the rear portion of the receiving hopper 3 and each hopper auger 17 has a hopper auger diameter HD, and a hopper auger flighting 19 extending from a hopper auger shaft 21. The transition auger diameter TD is significantly greater than the hopper auger diameter HD, since the transition auger 11 will receive and transfer the granular material carried by all the hopper augers 17. A right hopper auger 17R is in proximity to and parallel to the right side wall 7R and a left hopper auger 17L is in proximity to and parallel to the left side wall 5L.

The rotational axes RA of the hopper augers 17 coincide with the hopper auger shafts 21 which are parallel and spaced apart by a spacing distance SD that is substantially equal to or less than the hopper auger diameter HD and an auger drive is operative to rotate the hopper augers 17 at a hopper auger speed and to rotate the transition auger 11. With this arrangement, substantially the entire middle interior of the receiving hopper 3 is exposed to hopper auger flights 19 moving toward the transition auger 11 at the rear end of the receiving hopper 3. The hopper augers 17 in the receiving hopper 3 of FIG. 1 are shown with a spacing distance SD that is about 75% of the hopper auger diameter HD such that the flights 19 overlap.

The arrangement essentially fills the interior of the receiving hopper 3 with rearward moving hopper auger flights 19 such that there are no dead spots where granular material can simply rest, and capacity is increased. A significant depth of granular material is generated above the hopper augers 17 during conveying operations.

Figure 3:
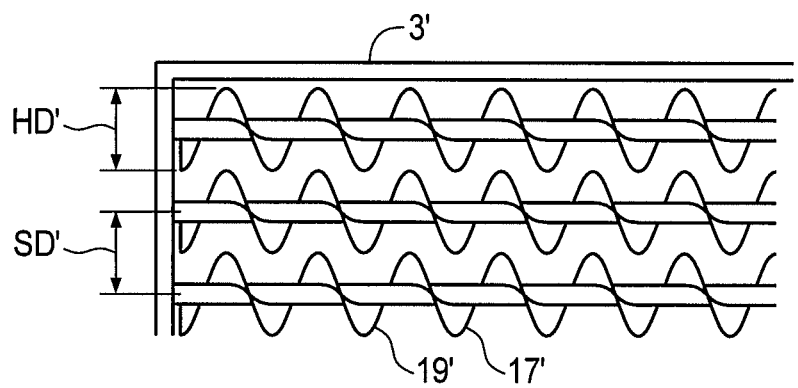
FIG. 3 is a schematic top view of an alternate arrangement of the hopper augers where the spacing distance between the hopper auger shafts is less than the diameter of the hopper augers, such that the hopper flights overlap.

Alternatively the hopper augers 17' in the receiving hopper 3' of FIG. 3 are shown with a spacing distance SD' that is substantially equal to the hopper auger diameter HD' such that the flights 19 are closely adjacent. It is contemplated that moving the hopper augers 17 closer together as in FIG. 1, with a spacing distance less than the hopper auger diameter HD so the flights overlap will provide more area of flight 19 moving rearward and so increase capacity over the arrangement of FIG. 3.

In a conventional receiving hopper with two or three augers spaced across the width of the receiving hopper, there is considerable space between the flight edges of the augers where granular material is not in contact with the auger flights and thus not moved rearward toward the intake of the transition auger. Conventional augers for such receiving hoppers are therefore larger in diameter to provide the capacity required or desired.

The height HR of the receiving hopper 3 is only slightly larger than the hopper auger diameter HD, and so by using hopper augers 17 with relatively small hopper auger diameters HD, such as between about 3.5 and 4.5 inches the height HR can be reduced to make it easier for trailer wheels to roll over the receiving hopper 3 in a drive-over type transfer conveyor.

The hopper augers 17 are timed such that a line TC through a top center of each hopper auger 19 flight is substantially perpendicular to the hopper auger shafts 21. It is contemplated that coordinating movement of laterally adjacent flights 19 will enhance movement of the granular material.

In the illustrated apparatus 1, the transition flight 13 comprises a tapered section 23 at the bottom end of the transition auger 11, where the tapered section 23 of auger flight tapers outward from a reduced diameter RTD at a bottom thereof to the transition auger diameter TD about where the transition auger 11 enters the transition auger tube 25.

As seen in FIG. 1 the rear ends of middle hopper augers 17 are in proximity to the bottom end of the transition auger 11, while rear ends of outer hopper augers 17 are connected by universal joints 31 to drive extension augers 27 that slope inwards along the tapered section 23 of the transition auger 11. The right and left hopper augers 17R, 17L drive corresponding right and left extension augers 27A that slope inward along the floor 9 of the receiving hopper 3.

The hopper auger 17X adjacent to the right hopper auger 17R drives an extension auger 27B that slopes inward and upward along the tapered section 23 of the transition auger 11, and similarly the hopper auger 17Y adjacent to the left hopper auger 17L drives an extension auger 27B that also slopes inward and upward along the tapered section 23 of the transition auger 11. The extension augers 27 push the granular material into the tapered section 23 of the transition auger 11, essentially force feeding same and increasing capacity.

Figure 4:
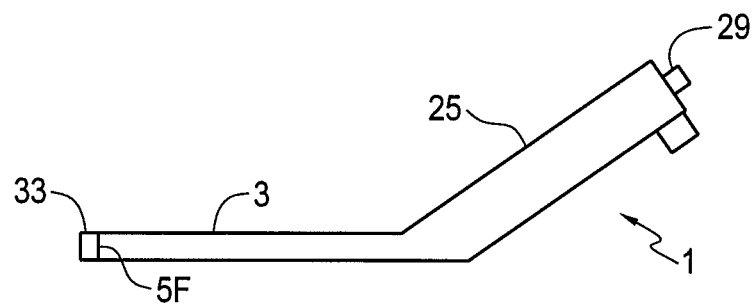
FIG. 4 is a schematic side view of the embodiment of FIG. 1 with the hopper auger drive mechanism mounted on the front end of the receiving hopper.

FIG. 4 schematically illustrates a typical apparatus 1 where the auger drive 29 such as a hydraulic motor or a linkage to a main conveyor rotates the transition auger 11 and the bottom end of the transition auger 11 is connected by a universal joint 31 to the rear end of a center hopper auger 17C, and a front end of the center hopper auger 17C is connected to a hopper drive mechanism 33 on an outside of the front wall 5F of the receiving hopper 3. The hopper drive mechanism 33 as is known in the art comprises chains, sprockets, or gears, or the like operative to rotate the hopper augers 17.

Figure 5:
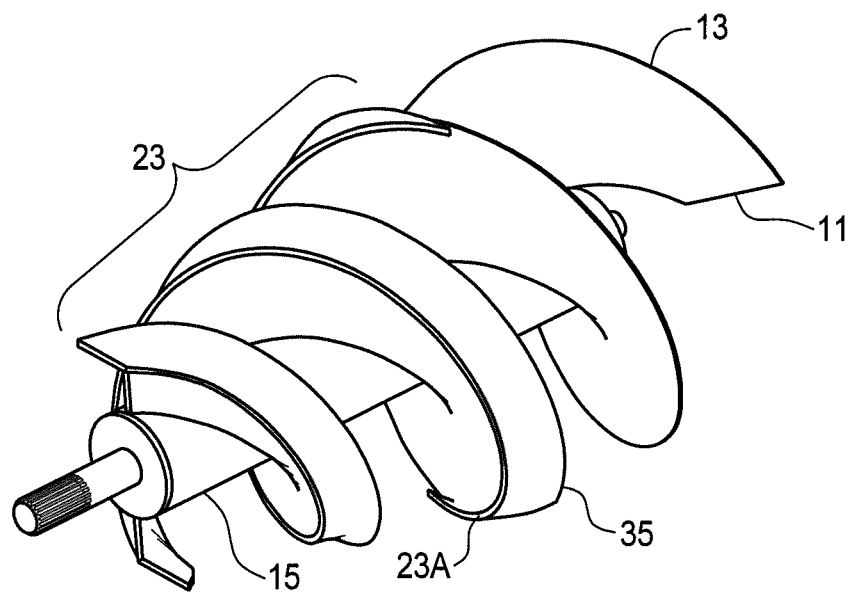
FIG. 5 is a schematic perspective view of the tapered section of the transition auger.

FIG. 5 schematically illustrates flight walls 35 extending generally in alignment with the transition shaft 15 from outer edges 23A of the tapered section 23 of the transition flight 13. The walls 35 keep granular material on the flight 23 preventing same from sliding off the edges 23A of the tapered section of flight 23, and increasing the amount of granular material carried up the transition auger 11.

Figure 6:
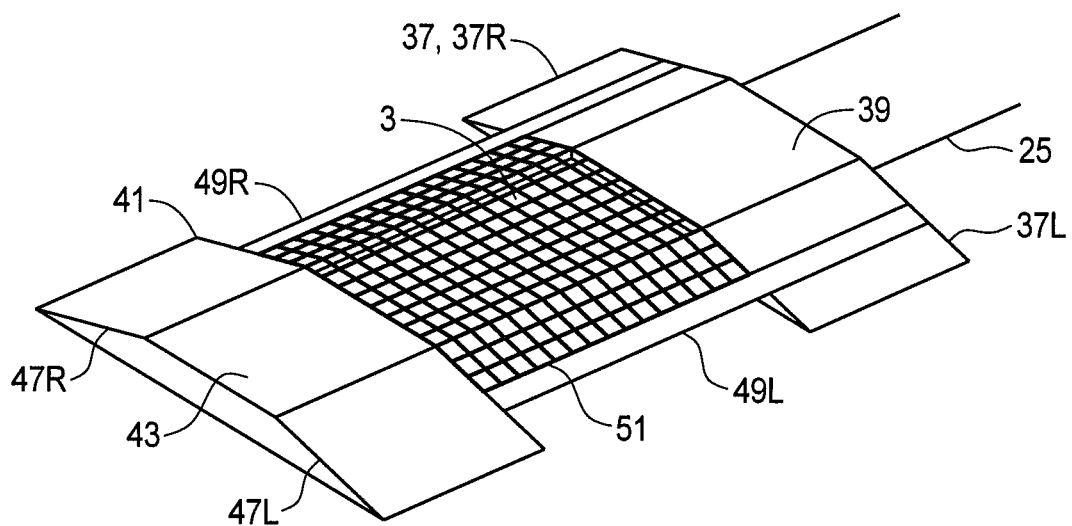
FIG. 6 is a schematic perspective view of the receiving hopper of the embodiment of FIG. 1 with hopper extensions, ramps, and a grate installed thereon for using the embodiment of FIG. 1 as a drive-over transfer conveyor and where the hopper extensions, ramps, and grate are in a lowered drive-over position.
Figure 7:
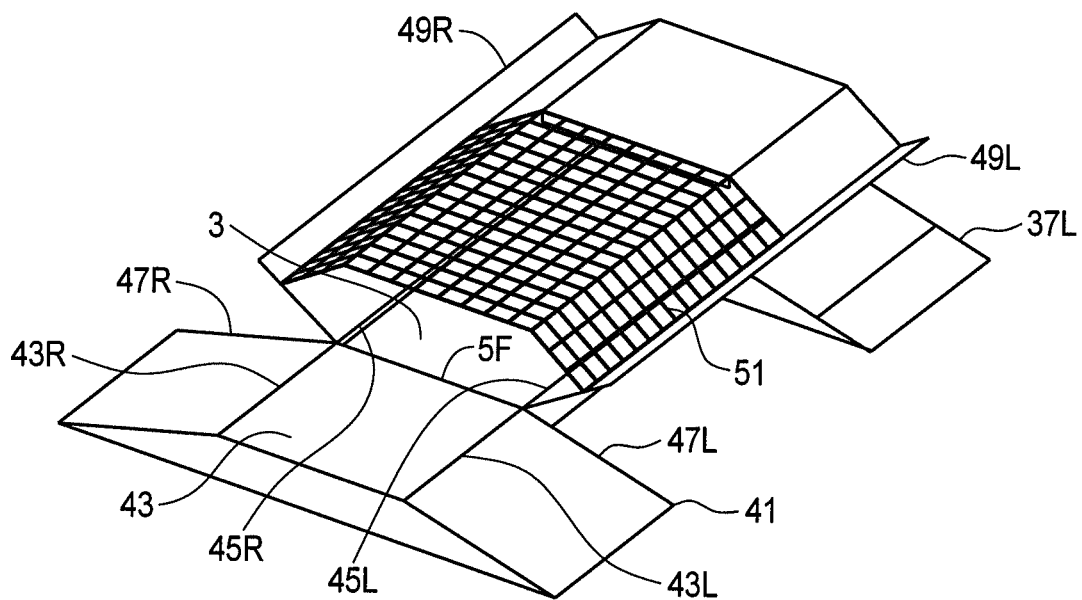
FIG. 7 is a schematic perspective view of the receiving hopper of FIG. 6 where the hopper extensions, ramps, and grate are in a raised operating position.

While the apparatus 1 can be used in a variety of situations where a transfer conveyor is required, the low profile makes the apparatus 1 very suitable for a drive over receiving hopper. FIGS. 6 and 7 schematically illustrate the receiving hopper 3 with right and left rear ramps 37R, 37L sloping downward and outward from rear portions of the corresponding right and left side walls 7R, 7L of the receiving hopper 3. A wheel support member 39 extends over the receiving hopper 3 aligned with the right and left rear ramps 37 and is configured support the wheels of a loaded trailer passing over the receiving hopper 3. Because granular material is carried in something like a wave above the hopper augers 17 there is a considerable depth of granular material above the hopper augers 17 at the rear end of the receiving hopper 3 where the wheel support member 39 is located. Thus it is necessary that the wheel support member 39 be movable from the lowered drive-over position illustrated in FIG. 5, to a raised operating position shown in FIG. 6 where same does not interfere with the flow of granular material.

A front ramp apparatus 41 is attached to a front end of the receiving hopper 3, and comprises a top plate 43 with right and left edges 43R, 43L substantially aligned with the top edges 45R, 45L of the right and left side walls of the receiving hopper 3, and right and left front ramps 47R, 47L sloping downward and outward from the right and left edges 43R, 43L of the top plate 43. The front ramp apparatus 41 is outside the receiving hopper 3 and so can remain in the same position during drive-over or conveying operations.

To contain the depth of granular material that is generated above the hopper augers 17 during conveying operations, right and left hopper extension plates 49R, 49L are pivotally attached to the top edges 45R, 45L of the right and left side walls. The right and left hopper extension plates 49R, 49L extend rearward from the front wall 5F of the receiving hopper 3 and are movable from a lowered drive-over position resting on the corresponding right and left rear ramps 37 as seen in FIG. 6, to a raised operating position sloping upward and outward from the top edges 45R, 45L of the corresponding right and left side walls.

Typically a grate 51 for safety will extend over the middle portion of the receiving hopper 3 where the discharge of a hoppered trailer will be located. This grate 51 is also movable from a lowered drive-over position substantially aligned with top edges 45R, 45L of the right and left side walls as seen in FIG. 6, to a raised operating position as seen in FIG. 7. Conveniently as shown, the grate 51 and the wheel support member 39 are pivotally attached to the right and left hopper extensions 49R, 49L and move with the right and left hopper extensions 49R, 49L from the lowered drive-over position of FIG. 6 to the raised operating position of FIG. 7.

The present disclosure provides a transfer conveyor apparatus 1 with a low profile receiving hopper 3, while providing significant capacity. The low profile of the apparatus 1 makes same well suited to use as a drive-over type transfer auger.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A transfer conveyor apparatus comprising:
    a substantially horizontally oriented receiving hopper defined by front and rear end walls, right and left side walls, and a floor;
    a transition auger with a transition auger diameter, a transition flight, and transition shaft sloping upward and rearward from a bottom end thereof located in a rear portion of the receiving hopper;
    a plurality of hopper augers extending from the front wall to the rear portion of the receiving hopper, each hopper auger having a hopper auger diameter, and a hopper auger fighting extending from a hopper auger shaft;
    wherein the plurality of hopper augers includes a right hopper auger in proximity to and parallel to the right side wall, a left hopper auger in proximity to and parallel to the left side wall and middle hopper augers substantially parallel to and between the right and left hopper augers;
    wherein the hopper auger shafts are parallel and spaced apart by a spacing distance substantially equal to or less than the hopper auger diameter; and
    an auger drive operative to rotate the hopper augers and the transition auger.

2. The apparatus of claim 1 wherein the hopper augers are timed such that a line through a top center of each hopper auger flight is perpendicular to the hopper auger shafts.

3. The apparatus of claim 1 wherein the hopper auger shafts are spaced apart by a distance that is less than the hopper auger diameter.

4. The apparatus of claim 1 wherein the transition flight comprises a tapered section at the bottom end of the transition auger, wherein the tapered section tapers outward from a reduced diameter at a bottom thereof to the transition auger diameter.

5. The apparatus of claim 4 wherein rear ends of the middle hopper augers are in proximity to the bottom end of the transition auger.

6. The apparatus of claim 5 wherein rear ends of the right and left hopper augers are connected to drive extension augers that slope inwards along the tapered section of the transition auger.

7. The apparatus of claim 6 wherein the right and left hopper augers drive corresponding right and left extension augers that slope inward along the floor of the receiving hopper.

8. The apparatus of claim 7 wherein the hopper auger adjacent to the right hopper auger drives an extension auger that slopes inward and upward along the tapered section of the transition auger, and the hopper auger adjacent to the left hopper auger drives an extension auger that slopes inward and upward along the tapered section of the transition auger.

9. The apparatus of claim 4 comprising flight walls extending upward from outer edges of the tapered section of the transition flight generally in alignment with the transition shaft.

10. The apparatus of claim 1 wherein the auger drive rotates the transition auger and the bottom end of the transition auger is connected to the rear end of a center hopper auger, and a front end of the center hopper auger is connected to a hopper drive mechanism on an outside of the front wall of the receiving hopper, the hopper drive mechanism operative to rotate the hopper augers.

11. The apparatus of claim 1 wherein the hopper auger diameter is between 3.5 and 4.5 inches.

12. The apparatus of claim 1 comprising right and left ramps sloping downward and outward from the right and left side walls of the receiving hopper.

13. The apparatus of claim 12 comprising:
    right and left rear ramps sloping downward and outward from rear portions of the corresponding right and left side walls;
    a wheel support member extending over the receiving hopper aligned with the right and left rear ramps, the wheel support member movable from a lowered drive-over position, to a raised operating position;
    a front ramp apparatus attached to a front end of the receiving hopper, the front ramp apparatus comprising a top plate with right and left edges substantially aligned with the top edges of the right and left side walls, and right and left front ramps sloping downward and outward from the right and left edges of the top plate.

14. The apparatus of claim 13 comprising right and left hopper extension plates pivotally attached to the top edges of the right and left side walls and extending rearward from the front wall of the receiving hopper, the right and left hopper extension plates movable from a lowered drive-over position resting on the corresponding right and left rear ramps, to a raised operating position sloping upward and outward from the top edges of the corresponding right and left side walls.

15. The apparatus of claim 14 comprising a grate over at least a portion of the receiving hopper, the grate movable from a lowered drive-over position substantially aligned with top edges of the right and left side walls, to a raised operating position.

16. The apparatus of claim 15 wherein the grate and the wheel support member are pivotally attached to the right and left hopper extensions and move with the right and left hopper extensions from the lowered drive-over position to the raised operating position.

* * * * *

UNITED STATES PATENT AND TRADEMARK OFFICE
CERTIFICATE OF CORRECTION

PATENT NO. : 9,676,569 B2
APPLICATION NO. : 15/093847
DATED : June 13, 2017
INVENTOR(S) : Cameron Dwight Bodie et al.

It is certified that error appears in the above-identified patent and that said Letters Patent is hereby corrected as shown below:

In the Claims

Column 5, Claim 1, Line 50, reads "auger fighting extending..." which should be deleted and replaced with "auger flighting extending..."

Signed and Sealed this
First Day of August, 2017

Joseph Matal
*Performing the Functions and Duties of the*
*Under Secretary of Commerce for Intellectual Property and*
*Director of the United States Patent and Trademark Office*